United States Patent
Wang

[11] Patent Number: 5,914,477
[45] Date of Patent: Jun. 22, 1999

[54] LINE FOCUS BARCODE SCANNER

[75] Inventor: Mark Shi Wang, Fremont, Calif.

[73] Assignee: NCR Corporation, Dayton, Ohio

[21] Appl. No.: 08/669,759

[22] Filed: Jun. 26, 1996

[51] Int. Cl.[6] .................................................. G06K 7/10
[52] U.S. Cl. ............................. 235/462.1; 235/462.32; 235/462.33; 235/472.01
[58] Field of Search ..................... 235/462, 472, 235/454, 466, 462.1, 462.32, 462.33, 472.01

[56] References Cited

U.S. PATENT DOCUMENTS

| | | | |
|---|---|---|---|
| 4,019,026 | 4/1977 | Nakanishi et al. | 235/462 |
| 4,335,302 | 6/1982 | Robillard | 235/462 |
| 4,390,235 | 6/1983 | Minoura | 250/6.1 |
| 4,428,647 | 1/1984 | Sprague et al. | 250/167 |
| 4,542,528 | 9/1985 | Sanner et al. | 382/62 |
| 4,820,911 | 4/1989 | Arackellian et al. | 235/462 |
| 4,843,222 | 6/1989 | Hochgraf | 235/470 |
| 4,874,933 | 10/1989 | Sanner | 235/470 |
| 4,963,756 | 10/1990 | Quan et al. | 235/472 |
| 5,010,241 | 4/1991 | Butterworth | 235/462 |
| 5,132,524 | 7/1992 | Singh et al. | 235/467 |
| 5,235,167 | 8/1993 | Dvorkis et al. | 235/462 |
| 5,258,605 | 11/1993 | Metlitsky et al. | 235/462 |
| 5,308,966 | 5/1994 | Danielson et al. | 235/472 |
| 5,315,095 | 5/1994 | Marom et al. | 235/462 |
| 5,354,977 | 10/1994 | Roustaei | 235/472 |
| 5,414,250 | 5/1995 | Swartz et al. | 235/462 |
| 5,414,251 | 5/1995 | Durbin | 235/462 |
| 5,420,943 | 5/1995 | Mak | 235/466 |
| 5,545,886 | 8/1996 | Metlitsky et al. | 235/462 |
| 5,600,119 | 2/1997 | Dvorkis et al. | 235/462 |
| 5,621,203 | 4/1997 | Swartz et al. | 235/462 |
| 5,627,366 | 5/1997 | Katz | 235/462 |
| 5,637,851 | 6/1997 | Swartz et al. | 235/462 |
| 5,640,001 | 6/1997 | Danielson et al. | 235/472 |

FOREIGN PATENT DOCUMENTS

| | | | |
|---|---|---|---|
| 0176780 | 10/1983 | Japan | 235/462 |
| 0235277 | 11/1985 | Japan | 235/462 |
| 0054570 | 3/1986 | Japan | 235/462 |
| 0256094 | 11/1987 | Japan | 235/462 |
| 0184178 | 7/1988 | Japan | 235/462 |
| 0191288 | 8/1988 | Japan | 235/462 |
| 0129779 | 5/1990 | Japan | 235/462 |
| 405189591 | 7/1993 | Japan | 235/462 |

*Primary Examiner*—Donald Hajec
*Assistant Examiner*—Douglas X. Rodriguez
*Attorney, Agent, or Firm*—Francis L. Conte

[57] ABSTRACT

A barcode scanner includes a light source for producing a scan line of light on a 2-D barcode along one of the two axes thereof. The scan line is scanned across the barcode along the other axis to effect a scanning band extending over the barcode in both of the two axes. Light reflected from the barcode is collected with a photodetector array to produce signals which are processed for decoding the barcode in both axes.

22 Claims, 4 Drawing Sheets

LINE FOCUS BARCODE SCANNER

BACKGROUND OF THE INVENTION

The present invention relates generally to barcode scanners, and, more specifically, to laser barcode scanners.

Common barcodes are used to identify certain information relating to an item or product to which they are affixed. A typical one dimensional (1-D) barcode includes a series of parallel lines and spaces of varying widths which in accordance with known conventions may be used to represent desired information relating to the item. A two dimensional (2-D) barcode provides more complex lines and spaces in two orthogonal axes for representing even more information regarding an item than is available in 1-D barcodes.

In either case, the barcodes must be optically read for decoding the information represented therein for subsequent use. Various barcode readers have been developed to decode the barcodes into multiple digit representations for inventory, production tracking, and for checkout or sales purposes, for example. Barcode scanners may either be fixed or portable, and therefore vary in complexity. Optical scanners must focus light for reading the barcodes, and variable distance reading also increases the complexity of the barcode scanner.

A simple type of barcode scanner includes a photodetector array known as a charge coupled device (CCD) which collects reflected light from the barcode to produce an image thereof which may then be suitably decoded in a processor. Either ambient light or light from light emitting diodes (LED), for example, may be used as the light source. Since these light sources have relatively low intensity, the typical CCD scanner is limited in resolution and cannot read a barcode any larger than the window of the corresponding scanning head, nor can it read barcodes at variable distances away from the window typically outside the range of about 1 and ½ inches.

Another type of barcode scanner uses laser light for the light source, which may be typically provided by conventional laser diodes. A laser barcode scanner enjoys the substantial advantage of significantly higher resolution than that of CCD scanners, with the ability to scan barcodes at substantially greater variable distances from the scanner window substantially greater than that of the CCD scanner. However, laser scanners are substantially more complex and expensive to manufacture than CCD scanners since they typically include suitable scanning optics for rastering the laser beam in sequential passes over the barcode at a suitable scanning frequency for decoding the barcode. Rastering is typically effected by using a rotating multi-faceted mirror which is inherently limited in speed.

For 1-D barcodes, conventional laser scanners are commonly available. However, 2-D barcodes require decoding in two orthogonal axes which increases the processing time of a typical laser scanner. Since typical laser raster scanners are inherently limited by the mechanical rastering speed thereof, it is desirable to have an improved laser scanner for decoding 2-D barcodes at increased speed and with the relatively high resolution and depth of field of laser scanners.

SUMMARY OF THE INVENTION

A barcode scanner includes a light source for producing a scan line of light on a 2-D barcode along one of the two axes thereof. The scan line is scanned across the barcode along the other axis to effect a scanning band extending over the barcode in both of the two axes. Light reflected from the barcode is collected with a photodetector array to produce signals which are processed for decoding the barcode in both axes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
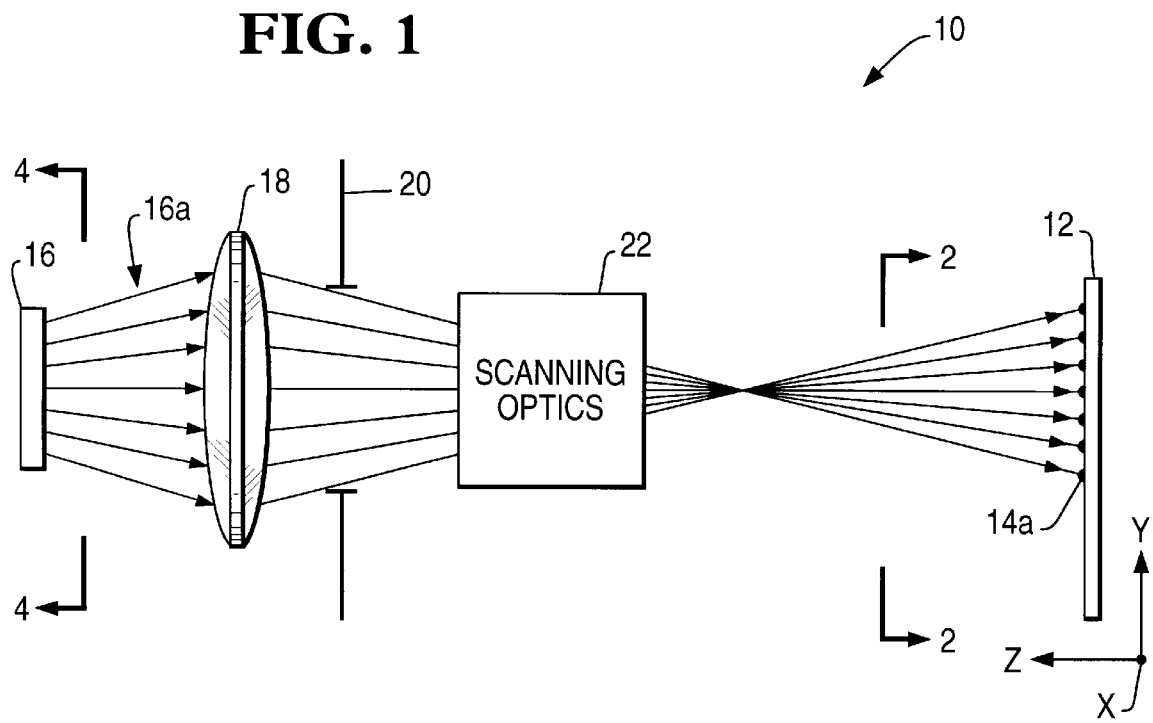
FIG. 1 is a schematic representation of the light scanning optical path of an exemplary 2-D barcode scanner effective for producing a scan line in accordance with one embodiment of the present invention.
Figure 2:
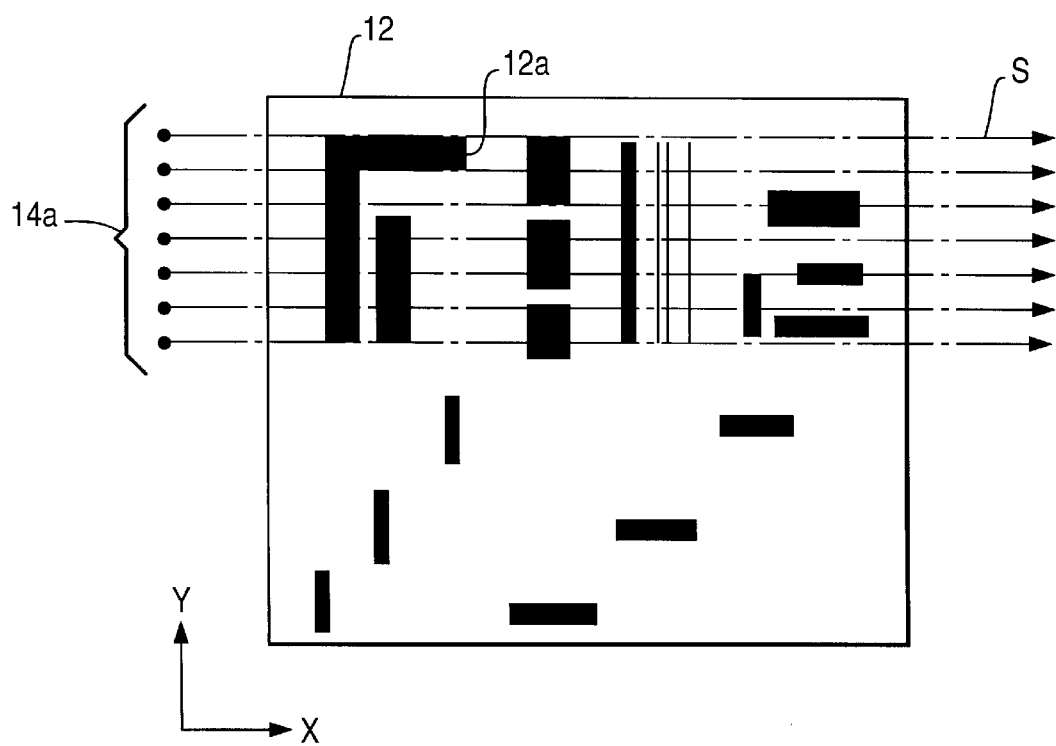
FIG. 2 is a front elevational view of an exemplary 2-D barcode schematically showing scanning of the scan line illustrated in FIG. 1 and taken generally along line 2—2.

Illustrated schematically in FIG. 1 is the light scanning or delivery optical path of a 2-D barcode scanner 10 for decoding a suitable 2-D barcode 12 in accordance with one embodiment of the present invention. An arbitrary embodiment of the 2-D barcode 12 is illustrated in FIG. 2 as having a plurality of suitable data symbols or elements 12a extending along first and second orthogonal axes designated X and Y. The barcode symbols 12a may take any conventional form with varying widths and spacing in both axes X, Y for encoding in the barcode 12 any suitable information. The specific details of the 2-D barcode 12 are not part of the present invention, except that the barcode 12 requires reading along both axes X, Y for decoding the different information therein.

Referring again to FIG. 1, means are provided for producing a transverse scan line 14a of light on the barcode 12 along the second axis Y. In the exemplary embodiment illustrated in FIG. 1, this is accomplished using a light source in the exemplary form of a conventional laser diode array 16 which is effective for producing a plurality of simultaneous laser light beams collectively defining the scan line 14a. A conventional focusing lens 18 and aperture 20 are optically aligned with the light array 16 for suitably focusing the scan line 14a on the barcode 12.

Conventional means 22 are provided for scanning the scan line 14a across the barcode 12 along the first axis X in a scanning direction S (see FIG. 2) to effect over a short time interval a broad band of scanning light extending over a suitable portion of the barcode symbols 12a in both of the first and second axes X, Y. The scanning means 22 may take any conventional form including, for example, a multifaceted rotating mirror, folding mirrors, and any other type of optical elements for effecting a compact laser scanner. But for the laser diode array 16 illustrated in FIG. 1, the light delivery portion of the barcode scanner 10 may be otherwise conventional in configuration and function. Instead of scanning a single laser light beam in a single spot across the barcode 12 along the first axis X, the light array 16 allows the simultaneous scanning of a suitable number of separate and distinct light beams for simultaneously scanning a plurality of spots across the barcode 12 along the first axis.

In this exemplary embodiment, a single focusing lens 18 is optically aligned with the adjoining light array 16 for focusing each of the light beams at corresponding spots on the barcode 12 to collectively and simultaneously define the scan line 14a along the second axis as a dotted line. In this way, simultaneous and multiple light delivery paths are provided for decoding corresponding portions of the barcode 12 along both the first and second axes in each scanning cycle.

Figure 3:
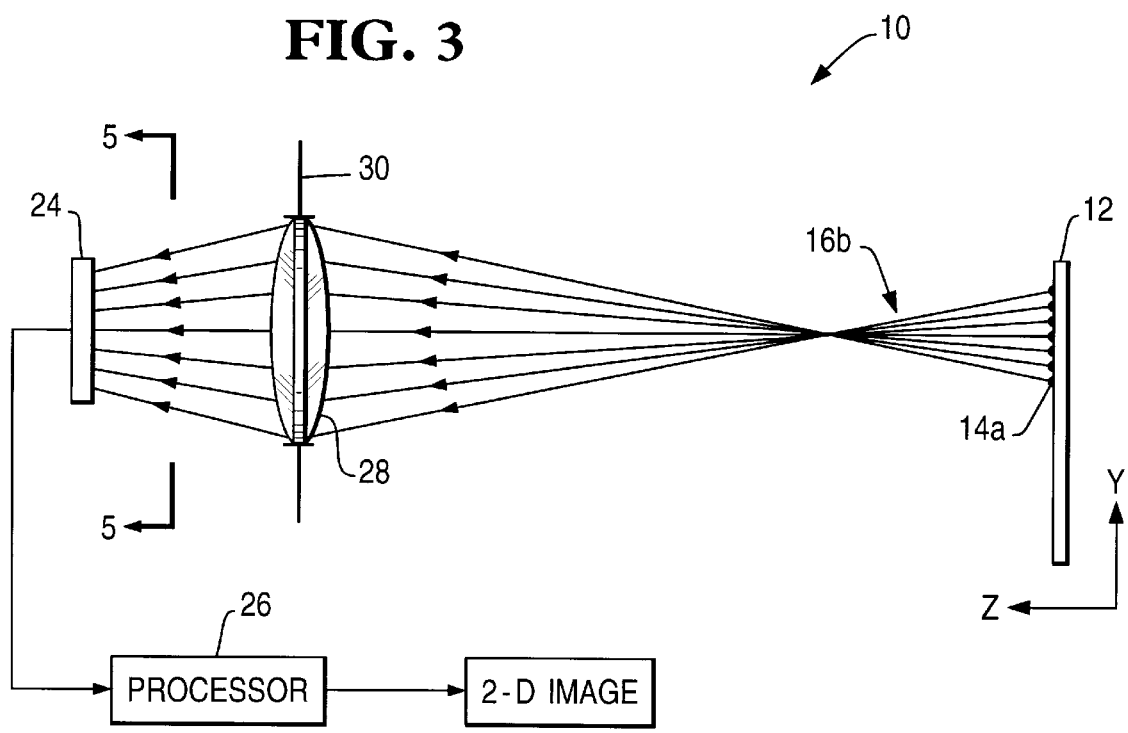
FIG. 3 is a schematic representation of the collection optical path of the exemplary barcode scanner corresponding with the light delivery optical path illustrated in FIG. 1.

FIG. 3 illustrates schematically the optical collection path of the barcode scanner 10 in accordance with an exemplary embodiment of the present invention which may be suitably combined with the light delivery path illustrated in FIG. 1 in any conventional manner. For example, the collection path illustrated in FIG. 3 may use corresponding ones of the folding mirrors found in the conventional scanning optics 22 for returning the reflected or back scattered light for detection. The initial light from the light array 16 illustrated in FIG. 1 is identified as forward light or beam 16a which passes through the various optics to define the scan line 14a on the barcode 12. This light is reflected or back scattered from the barcode 12 as illustrated in FIG. 3 and is referred to as the reflected light or scan line 16b.

Figure 4:
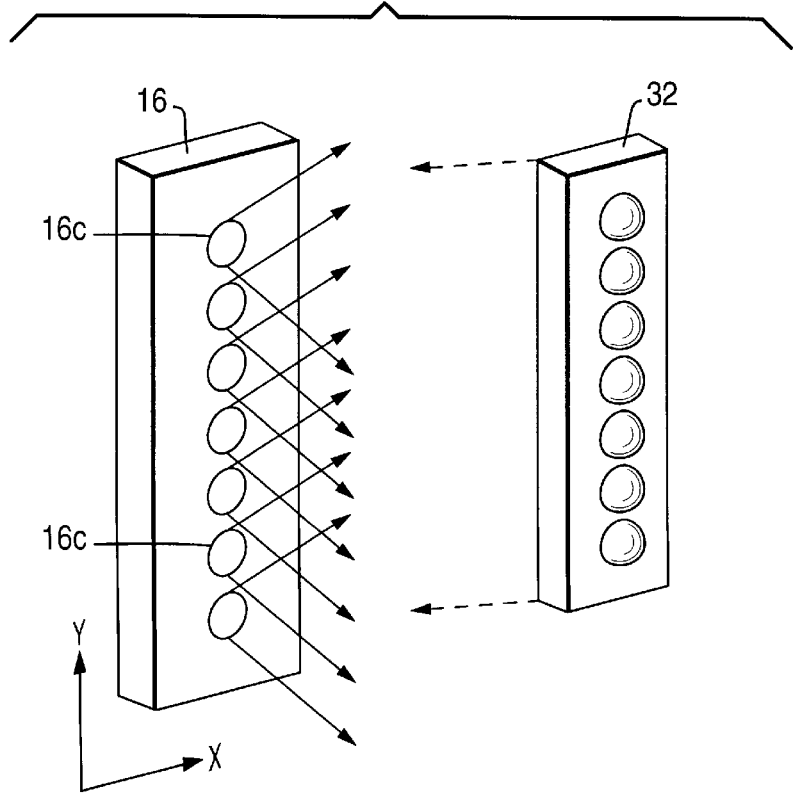
FIG. 4 is an exploded, isometric schematic representation of an exemplary light source in the form of a laser diode array as shown in FIG. 1 and taken along line 4—4.

The light array 16 is illustrated in an exemplary embodiment in FIG. 4 and includes a plurality of adjoining light sources in the exemplary form of conventional laser diodes 16c. A suitable number of the light sources 16c are provided for producing a corresponding plurality of light beams 16a for collectively defining the scan line 14a simultaneously. The focusing lens 18 illustrated in FIG. 1 is optically aligned with the adjoining light sources 16c for focusing each of the light beams at corresponding spots on the barcode 12 to collectively and simultaneously define the scan line 14a along the second axis Y as shown by the dotted line in FIG. 2.

In accordance with another feature of the present invention, means are provided for collecting the reflected scan line 16b reflected from the barcode 12 due to the illuminating scanning line 14a. This collecting means preferably includes a photodetector array 24 of discrete photodetectors 24a as shown in more particularity in FIG. 5. The photodetectors 24a are suitably aligned for detecting the reflected scan line 16b along the second axis Y. The photodetectors 24a produce an array of electrical signals corresponding to the number of photodetectors 24a which are conventionally electrically channeled to a suitable processor 26, shown in FIG. 3.

The processor 26 may take any conventional form including a digitally programmable computer for suitably processing the reflected scan line signals for decoding the barcode 12 in both the first and second axes X, Y. Differences in intensity of each photodetector over succeeding time intervals is used for decoding the barcode 12 along the first axis X, while differences in intensity of the detected light along the second axis Y from photodetector-to-photodetector in a given instant or interval of time is used to decode the barcode 12 along the second axis Y. The respective signals from the photodetectors 24a are suitably amplified and processed individually to collectively decode the barcode 12 to produce its corresponding 2-D image in any suitable form for subsequent use by the user. It is preferred to process the signals first along the first axis X, and then along the second axis Y while temporarily storing the data in a suitable memory buffer.

Figure 5:
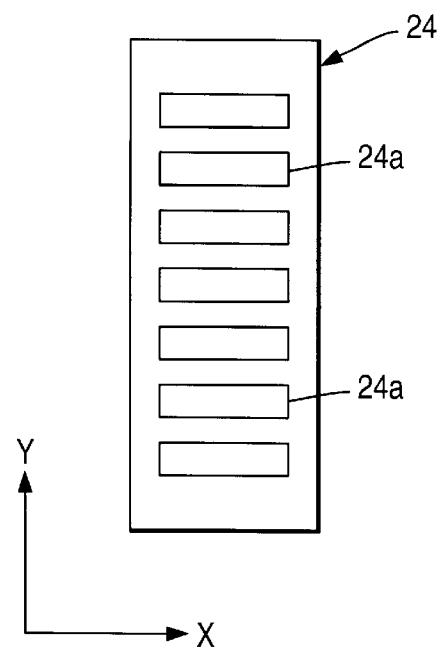
FIG. 5 is an elevational front view of an exemplary embodiment of a photodetector array for collecting light in the collection path illustrated in FIG. 3 and taken along line 5—5.

The light collecting means further comprises a conventional collection or focusing lens 28 as shown in FIG. 3 for focusing the reflected scan line 16b on the photodetector array 24. As shown in FIG. 5, the photodetectors 24a are preferably linearly aligned with each other along the second axis Y, with the scan line 14a, as illustrated in FIGS. 1 and 2 for example, being preferably straight or linear. The photodetectors 24a illustrated in FIG. 5 are also preferably coaxially aligned in a single row for receiving the reflected scan line 16b along the second axis Y.

The processor 26 illustrated in FIG. 3 is preferably operatively joined to the photodetector array 24 and configured for processing the reflected scan line signals in parallel. This may be accomplished either simultaneously with multichannel processing of signals from each of the individual photodetectors 24a; or it may be accomplished serially using a suitable memory buffer and operating at a sufficiently fast processing speed for effectively simultaneously processing the signals from the individual photodetectors 24a at a faster rate than the scanning rate of the scan line 14a along the first axis X.

The photodetectors 24a illustrated in FIG. 5 may take any conventional form such as conventional photodiode arrays. In the exemplary embodiment illustrated in FIG. 5, the photodetectors 24a may take the form of commercially available UDT Sensors Inc., Model A2V-16, sixteen element photodiode array. In alternate embodiments, a linear array of conventional charge coupled devices (CCD) may be used.

The photodetectors 24a are preferably rectangular in configuration with relatively long and narrow sides, and are coaxially stacked together along the long sides thereof. The individual photodetectors 24a are suitably laterally spaced apart between their long sides as required for cooperating with the imaging optics and the spacing of the corresponding light array 16. The rectangular shape improves collection of the reflected scan line 16b and allows a larger depth of field in the case of defocusing when the barcode 12 is positioned at various distances from the scanner. The photodetectors 24a are longer than they are wide in the direction of scanning along the first axis X for collecting sufficient data for use in decoding the barcode 12 along the second axis Y at specific intervals in time.

In the preferred embodiment illustrated in FIG. 3, a collection aperture 30 is provided in cooperation with the collection lens 28, with the aperture 30 preferably being rectangular for matching the rectangular photodetectors 24a to project and constrain the reflected light thereacross. This improves collection of the reflected scan line 16b, but conventional collection apertures may be used instead if desired.

In the preferred embodiment, the plurality of light sources 16c illustrated in FIG. 4 and corresponding photodetectors 24a illustrated in FIG. 5 are configured and optically aligned in a one-to-one correspondence so that the light beams from each of the light sources 16c are reflected from the barcode 12 for detection by primarily only a corresponding one of the photodetectors 24a. As indicated above, the light sources 16a are preferably conventional laser diodes for producing respective laser beams. As shown in FIG. 4, laser diodes provide diverging laser beams which may be suitably focused by the focusing lens 18 itself illustrated in FIG. 1, or in a preferred embodiment, a conventional lenslet array 32 may be disposed between the laser diodes 16c and the focusing lens 18 for assisting in suitably focusing the individual laser beams.

The multiple laser diodes 16c illustrated in FIG. 4 are effective for providing the high resolution capability of using laser beams in the light delivery optical path of the barcode scanner. As shown in FIG. 1, the individual laser beams are suitably focused to define the dotted scan line 14a on the barcode 12 along the second axis Y, with the scan line 14a being conventionally traversed or scanned along the first axis X. In this way, multiple and simultaneous laser beams are scanned across any desired portion of the barcode 12 as illustrated in FIG. 2. The number and spacing of the corresponding laser diodes 16c and photodetectors 24a may be selected as desired for covering as much of the barcode 12 along the second axis Y as desired in either a single or multiple overlapping passes.

In this way, the number of sequential scanning cycles required to completely cover and decode an individual barcode 12 may be substantially reduced while still maintaining the high resolution capability of a laser barcode scanner. The individual laser diodes 16c simultaneously produce laser spots which are simultaneously traversed across the barcode 12 which correspondingly reduces or eliminates rastering in the barcode scanner 10. Accordingly, the scanning mirror found in the scanning optics 22 may be operated at conventional rotary speeds or less, and does not limit the processing speed of the barcode when the laser diode array 16 is utilized.

Figure 6:
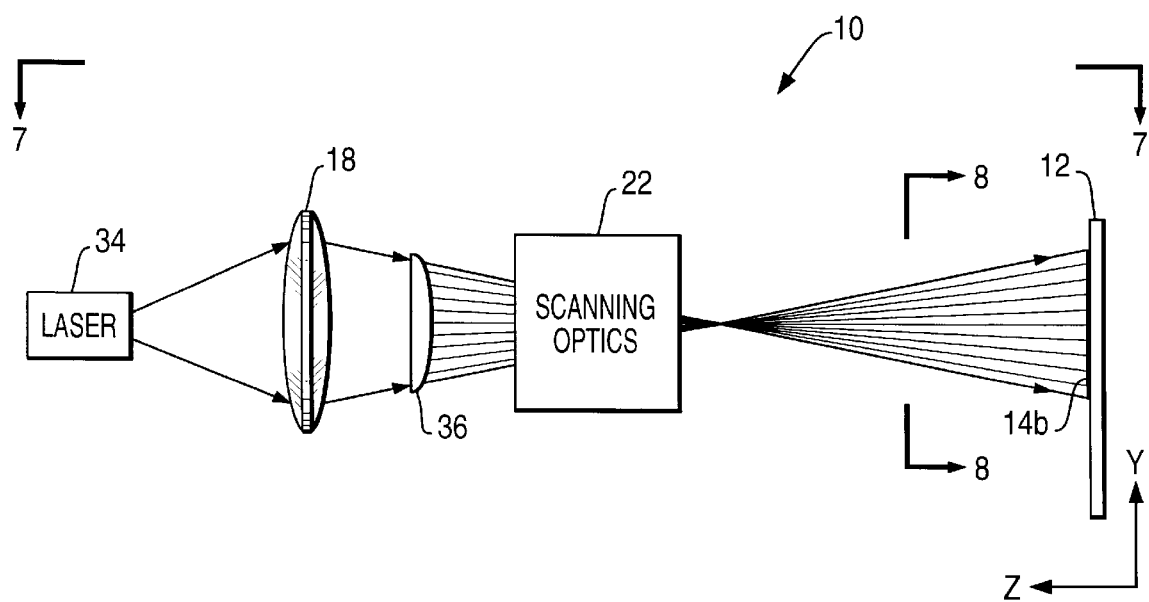
FIG. 6 is the light delivery optical path of a 2-D barcode scanner in accordance with a second embodiment of the present invention which cooperates with the collection path illustrated in FIG. 3.
Figure 7:
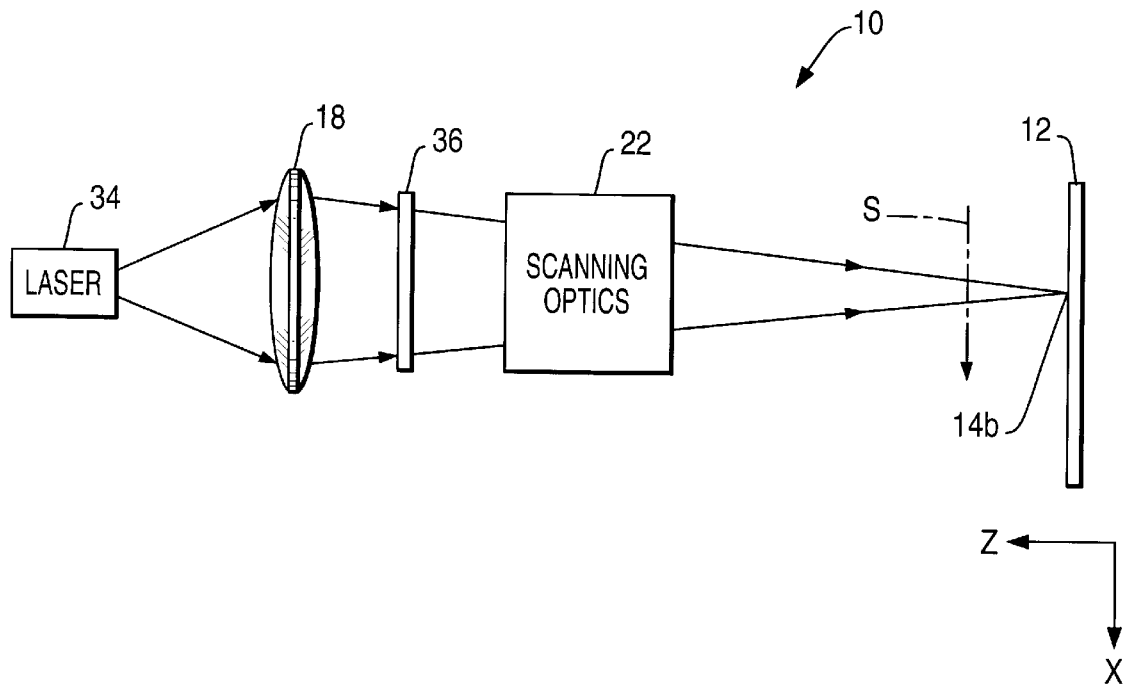
FIG. 7 is a top view of the collection path illustrated in FIG. 6 and taken along line 7—7.

Instead of using the laser diode array 16, similar benefits and performance may be obtained by using a single laser 34 in an alternate embodiment of the invention as illustrated schematically in FIGS. 6 and 7. The laser 34 may take any conventional form and is effective for producing a single light beam which is focused by the focusing lens 18. In this embodiment, a conventional cylindrical lens 36 is optically aligned and cooperates with the focusing lens 18 to focus the light from the laser 34 along the second axis Y as a continuous or solid scan line 14b. The cylindrical lens 36 is optically aligned between the focusing lens 18 and the scanning optics 22 and is effective for spreading the light beam from the laser 34 along the second axis Y to effect the scan line 14b.

FIGS. 6 and 7 illustrate the light delivery path of the scanner 10 which may be used with the collection path illustrated in FIG. 3. FIGS. 6 and 7 show the delivery path in two perpendicular planes with the cylindrical lens 36 having zero power in the X-Z plane illustrated in FIG. 7, with the focusing lens 18 being effective for focusing the laser beam at a spot on the barcode 12. In the Y-Z plane illustrated in FIG. 6, both lenses 18 and 36 have power, with the cylindrical lens 36 focusing the laser beam along a finite line to create the solid scan line 14b focused at the barcode 12.

In the exemplary embodiment illustrated in FIGS. 6 and 7, the focusing and cylindrical lenses 18, 36 are separate and distinct. However, in alternate embodiments, these two lenses could be combined into a single astigmatic lens if desired. Other different combinations of positive or negative lenses may be used for creating the solid scan line 14b.

Figure 8:
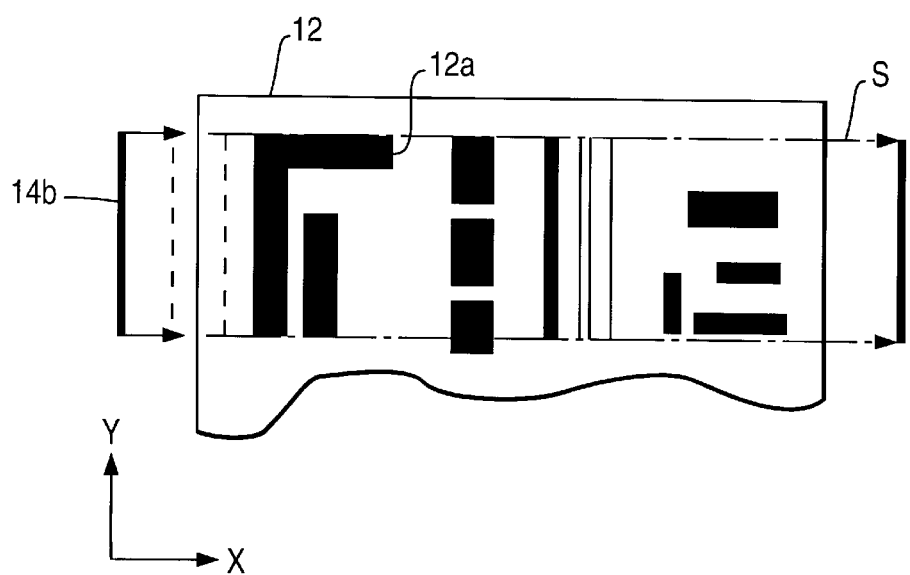
FIG. 8 is an elevational, front view of a portion of the 2-D barcode illustrated in FIG. 6 and taken generally along line 8—8 showing the light scanning band traversing thereacross.

FIG. 8 illustrates scanning of the solid scan line 14b along the first axis X in an identical manner to that of the dotted scan line 14a illustrated in FIG. 2. Since the same collection path illustrated in FIG. 3 may be used with the light delivery path illustrated in FIGS. 6 and 7, the photodetector array 24 will detect the reflected scan line 16b from the barcode 12 for use in decoding the barcode 12 along both the first and second axes in the same manner as described above with respect to decoding using the dotted scan line 14a.

In both embodiments described above, the high resolution of laser scanning is effected by the parallel processing of the reflected scan line 16b using the photodetector array 24. The multiple channel processing correspondingly increases the speed of operation and thereby allows decoding of the substantially more complex 2-D barcode 12 in a suitably short time. The line-focus laser scanner is therefore capable of both high speed parallel decoding and precise edge detection of the 2-D barcode. And, multiple sections along the first and second axes of the 2-D barcode may be read simultaneously. Although the barcode scanners 10 disclosed above are specifically configured for decoding 2-D barcodes, they are nevertheless backward compatible with 1-D barcodes since they still decode along the first axis X, as well as the second axis Y, which is irrelevant for 1-D barcodes.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A barcode scanner for decoding a 2-D barcode having data symbols along first and second orthogonal axes, comprising:

means for producing a scan line of light on said barcode along said second axis;

means for scanning said scan line across said barcode along said first axis to effect a scanning band extending over said symbols in both of said first and second axes;

means for collecting light reflected from said barcode due to said scan line, and including an array of photodetectors aligned for detecting said reflected scan line and producing an array of signals corresponding to said array of photodetectors; and means for processing said reflected scan line signals for decoding said barcode in both said first and second axes.

2. A scanner according to claim 1 wherein said scan line is straight, and said photodetectors are correspondingly linearly aligned.

3. A scanner according to claim 2 wherein said photodetectors are coaxially aligned in a row for receiving said reflected scan line along said second axis.

4. A scanner according to claim 3 wherein said processing means are operatively joined to said photodetector array and configured for processing said reflected scan line signals in parallel.

5. A scanner according to claim 3 wherein said photodetectors are rectangular in configuration with relatively long and narrow sides, and are coaxially stacked together along said long sides thereof.

6. A scanner according to claim 5 wherein said collecting means further comprise a collection lens and cooperating collection aperture for focusing said reflected scan line on said photodetector array, and said collection aperture is rectangular for matching said rectangular photodetectors.

7. A scanner according to claim 3 wherein said scan line producing means comprise:

a light source; and a focusing lens optically aligned between said light source and said scanning means for focusing said scan line on said barcode.

8. A scanner according to claim 7 wherein said scan line producing means further comprise a plurality of adjoining light sources for producing a corresponding plurality of light beams collectively defining said scan line.

9. A scanner according to claim 8 wherein said focusing lens is optically aligned with said adjoining light sources for focusing each of said light beams at corresponding spots on said barcode to collectively define said scan line along said second axis as a dotted line.

10. A scanner according to claim 9 wherein said plurality of light sources and photodetectors are configured in a one-to-one correspondence so that said light beams from each of said light sources are reflected from said barcode for detection by a corresponding one of said photodetectors.

11. A scanner according to claim 10 wherein said light sources comprise an array of laser diodes.

12. A scanner according to claim 7 wherein said scan line producing means further comprise a cylindrical lens optically cooperating with said focusing lens to focus light from said light source along said second axis as a continuous scan line.

13. A scanner according to claim 12 wherein said focusing and cylindrical lenses are separate and distinct.

14. A scanner according to claim 13 wherein said light source is effective to produce a single light beam for spreading in said cylindrical lens to effect said scan line.

15. A scanner according to claim 14 wherein said light source is a laser.

16. A method of decoding a 2-D barcode having data symbols along first and second orthogonal axes, comprising:

producing a scan line of light on said barcode along said second axis;

scanning said scan line across said barcode along said first axis to effect a scanning band extending over said symbols in both of said first and second axes;

collecting light reflected from said barcode due to said scan line, and including an array of photodetectors aligned for detecting said reflected scan line and producing an array of signals corresponding to said array of photodetectors; and processing said reflected scan line signals for decoding said barcode in both said first and second axes.

17. A method according to claim 16 further comprising producing a plurality of adjoining light beams to collectively define said scan line as a dotted line.

18. A method according to claim 17 further comprising collecting light from said barcode in said photodetectors in a one-to-one correspondence with said plurality of light beams.

19. A method according to claim 16 wherein said scan line is continuous.

20. A method according to claim 19 further comprising focusing a single light beam in a spot on said barcode along said first axis, and in a line along said second axis to define said scan line.

21. A barcode scanner for decoding a two-dimensional barcode having a plurality of data symbols varying in width and spacing along both first and second orthogonal axes, comprising:

means for producing a scan line of light on said barcode along said second axis;

means for scanning said scan line across said barcode along said first axis to effect a scanning band extending over said symbols in both of said first and second axes;

means for collecting light reflected from said barcode due to said scan line, and including an array of photodetectors aligned for detecting said reflected scan line and producing an array of signals corresponding to said array of photodetectors; and means for processing said reflected scan line signals for decoding said barcode symbols of varying width and spacing in both said first and second axes.

22. A method of decoding a two-dimensional barcode having a plurality of data symbols varying in width and spacing along both first and second orthogonal axes, comprising:

producing a scan line of light on said barcode along said second axis;

scanning said scan line across said barcode along said first axis to effect a scanning band extending over said symbols in both of said first and second axes;

collecting light reflected from said barcode due to said scan line, and including an array of photodetectors aligned for detecting said reflected scan line and producing an array of signals corresponding to said array of photodetectors; and processing said reflected scan line signals for decoding said barcode symbols of varying width and spacing in both said first and second axes.

* * * * *